(12) United States Patent
Knott

(10) Patent No.: US 7,222,122 B2
(45) Date of Patent: May 22, 2007

(54) DATABASES

(75) Inventor: David S. Knott, Quorn (GB)

(73) Assignee: Rolls-Royce plc, London (GB)

( * ) Notice: Subject to any disclaimer, the term of this patent is extended or adjusted under 35 U.S.C. 154(b) by 395 days.

(21) Appl. No.: 10/351,425

(22) Filed: Jan. 27, 2003

(65) Prior Publication Data

US 2003/0154205 A1    Aug. 14, 2003

(30) Foreign Application Priority Data

Jan. 29, 2002    (GB)    ................................ 0201942.0

(51) Int. Cl.
G06F 17/30    (2006.01)
(52) U.S. Cl. .................................... 707/100; 707/104.1
(58) Field of Classification Search .................. 707/1, 707/2, 3, 4, 5, 6, 7, 8, 9, 10, 100, 104.1; 705/7
See application file for complete search history.

(56) References Cited

U.S. PATENT DOCUMENTS 5,752,016 A * 5/1998 Whittaker et al. ............. 707/3
6,175,830 B1 * 1/2001 Maynard ..................... 707/5
6,289,317 B1 * 9/2001 Peterson ..................... 705/7
6,314,426 B1 * 11/2001 Martin et al. ............... 707/100

FOREIGN PATENT DOCUMENTS

JP    20020496535 A    2/2002

* cited by examiner

Primary Examiner—Yicun Wu
(74) Attorney, Agent, or Firm—W. Warren Taltavull; Manelli Denison & Selter PLLC

(57) ABSTRACT

A database arrangement is provided which presents a user with a results table 56. This had two dimensions. Column headings show classification headings at a selected level of a classification structure. The rows are classified with additional identification of the content of data items within the database. Each point of the table shows the number of data items meeting the two criteria. The user can thus see the number of results available from various alternative refinements of a search strategy, before the search strategy is restricted.

11 Claims, 4 Drawing Sheets

Fig.4A.

Europe

| | France | U.K. | Spain |
|---|---|---|---|
| Leisure | 50 | 20 | 60 |
| Business | 25 | 70 | 40 |

Fig.4B.

Europe > U.K.

| | South | Midlands | North |
|---|---|---|---|
| Leisure | 10 | 3 | 7 |
| Business | 40 | 20 | 10 |

Fig.4C.

Europe > U.K. > Midlands

| | Birmingham | Nottingham |
|---|---|---|
| Walking | 0 | 1 |
| City breaks | 1 | 1 |
| Suppliers | 7 | 4 |
| Customers | 3 | 6 |

DATABASES

FIELD OF THE INVENTION

The present invention relates to databases and in particular to arrangements for interrogating databases as to their contents.

BACKGROUND OF THE INVENTION

In this specification, the term "database" is used to encompass a body of information formed by collating data items which have been selected according to appropriate criteria, and also to a more informal collection of data items which may be continuously changing and not under the control of a single authority, for example the body of information available from the internet or other public network.

A database user will usually require an arrangement for interrogating the database in order to identify data items of possible interest. The arrangement will typically involve software which interrogates the database in accordance with a search strategy entered by the user and which then provides to the user the results of that interrogation. Typically, these results will be in the form of a list of those data items retrieved identified as meeting the requirements of the search strategy. The order in which the data items are presented on the list is often unhelpful for identifying those of most interest, In the event that a large number of data items are listed, a user will need to conduct a further search with a narrower search strategy. In the event that no data items or too few data items are listed, a new search with a broader search strategy would be required. Formulation of these revised search strategies may be a matter of guesswork, to a significant degree. Consequently, although the interrogation arrangement may present results in a manner which gives the impression of sophistication, the quality of the results is dependent entirely on the search strategy and thus on the skill or imagination of the user. Inexperienced users may therefore find that inadequate or inappropriate results are produced, or that an unmanageable number of data items are identified. This can lead to frustration or disillusionment, deterring an inexperienced user from continuing to use the database.

SUMMARY OF THE INVENTION

In accordance with a first aspect of the invention, there is provided a database interrogation arrangement for use in relation to a database of data items classified according to a classification structure, in which a user is able to select a classification level within the structure, and is presented, in response to the selection, with a results table having at least two dimensions, one of the dimensions providing classification headings at the selected level of the structure, and another dimension representing classified additional identification of the content of data items within the headings provided, substantially each point of the table showing at least the number of data items within the corresponding heading and having content relevant to the corresponding additional identification.

A user to whom the classification headings of a level of the classification structure have been presented is preferably able to select the next lower level by selecting one of the headings presented. The user may be able to select the next higher level. The user is preferably provided with a results table at each level, as these selections are made. Preferably, a results table presents all classification headings which are at the selected level and which are sub-headings, within the classification structure, of a common heading at the next higher level.

The additional identification provided in a results table may be different according to the chosen level. The additional identification may represent the next lower level of the classification structure, or sub-classifications which do not form a layer within the classification structure.

Preferably the arrangement allows any point on the results table to be selected, alone or with others, and is operable to produce a list of those data items identified at that point of the table.

The arrangement may further provide for a search through those data items identified at one or more of the points on the results table, such as by a word search, to revise the number shown at that point, in accordance with the results of the search.

The arrangement may be used for entering data items into the database, by identifying appropriate classifications for the data item within the classification structure, and appropriate additional identifications of the contents of the data item. The classifications and additional identifications may be identified manually or automatically.

The invention also provides computer apparatus operable to provide a database interrogation arrangement as defined in any of the preceding definitions.

This aspect of the invention also provides computer software which, when installed on a computer system, is operable to provide a database interrogation arrangement as set out in any of the preceding definitions.

The invention further provides a carrier medium carrying computer software as defined in the preceding paragraph. The carrier medium may be a recording medium. Alternatively, the carrier medium may be a transmission medium, the software being carried by a signal propagating on the transmission medium.

In a second aspect, the invention provides database interrogation apparatus for use in relation to a database of data items classified according to a classification structure, the apparatus including selection means operable by a user to select a classification level within the structure, presentation means operable, in respect to a election, to present a results table having at least two dimensions, one of the dimensions providing classification headings at the selected level of the structure, and another dimension representing classified additional identification of the content of data items within the headings provided, substantially each point of the table showing at least the number of data items within the corresponding heading and having content relevant to the corresponding additional identification.

Preferably, the selection means is operable to allow a user, to whom the classification headings of a level of the classification structure have been presented, to select the next lower level by selecting one of the headings presented. The selection means may be operable to allow the user to select the next higher level. Preferably, the presentation means provides the user with a results table at each level, as these selections are made. Preferably, each results table presents all classification headings which are at the selected level and which are sub-headings, within the classification structure, of a common heading at the next higher level.

The additional identification provided in a results table may be different according to the chosen level. The additional identification may represent the next lower level of the classification structure or sub-classifications which do not form a layer within the classification structure.

Preferably the apparatus is operable to allow any point on the results table to be selected by a user, and to produce a list of those data items identified at that point of the table.

Preferably the apparatus is further operable to provide for a search through those data items identified at one or more of the points on the results table, such as by a word search, to revise the numbers shown at that point, in accordance with the results of the search.

Preferably, the apparatus is operable for entering data items into the database, by identifying appropriate classifications for the data item within the classification structure, and appropriate additional identifications of the contents of the data item. The classifications and additional identifications may be identified manually or automatically.

In a further aspect, the invention provides a results table to be presented to a user, the results table relating to data items within a database classified according to a classification structure, the results table having at least two dimensions, one of the dimensions providing classification headings at a level of the structure selected by a user, and another dimension representing classified additional identification of the content of data items within the headings provided, substantially each point of the table showing at least the number of data items within the corresponding heading and having content relevant to the corresponding additional identification.

The invention further provides a signal propagating over a transmission medium and representing a results table as defined in the preceding paragraph.

BRIEF DESCRIPTION OF THE DRAWINGS

Examples of the present invention will now be described in more detail, by way of example only, and with reference to the accompanying drawings, in which:

FIGS. 4A, 4B and 4C illustrate results tables provided in accordance with the invention.

Overview of Hardware and Software

DETAILED DESCRIPTION OF THE INVENTION

Figure 1:
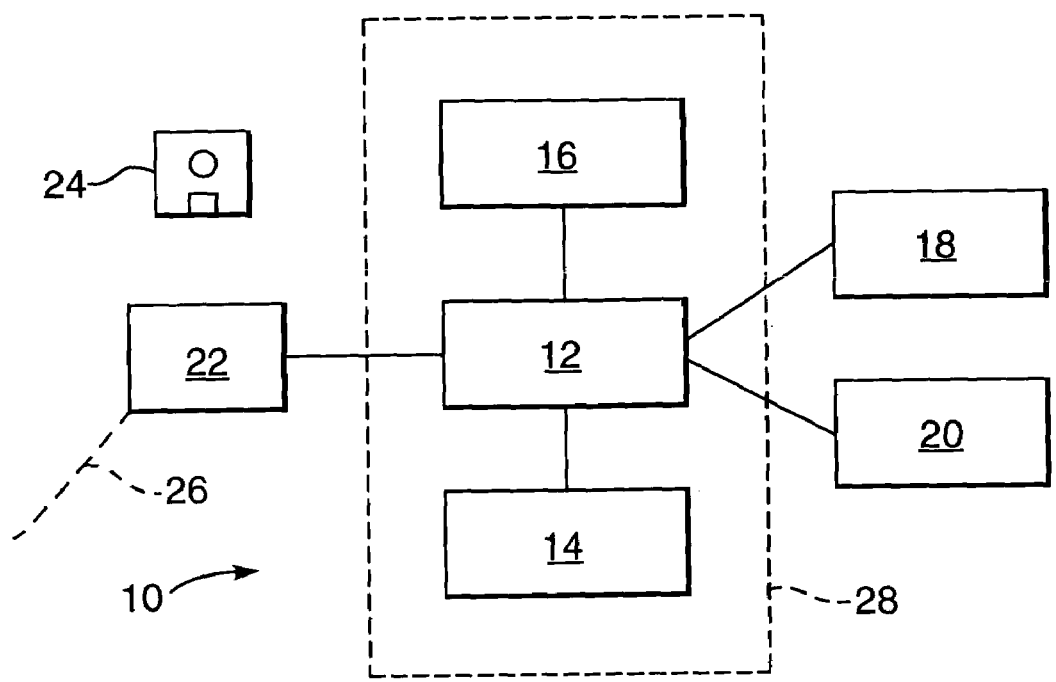
FIG. 1 is a highly simplified schematic diagram of a general purpose computer by means of which the present invention may be implemented.

FIG. 1 illustrates a general purpose computer 10 by means of which the present invention may be implemented. The computer 10 may be, for example, an IBM compatible personal computer (PC) running under appropriate software control. The computer includes a central processor 12 with associated main (RAM) memory 14 and auxiliary memory 16 in the form of a hard disc drive. A display screen and keyboard are provided at 18 and 20, respectively, for use by a user. Other conventional input and output arrangements may be provided at 22, preferably including a device for reading a portable memory medium such as a floppy disc 24, by means of which software and/or data may be loaded into or out of the computer 10. An external communication link 26, such as a connection to the internet or other public or private network is also preferably provided, for reasons which will become apparent.

A skilled reader will have no difficulty in obtaining appropriate hardware and software to form a general purpose computer of the type described above and suitable for implementing the present invention, once the following description of embodiments of the present invention has been fully understood.

Figure 2:
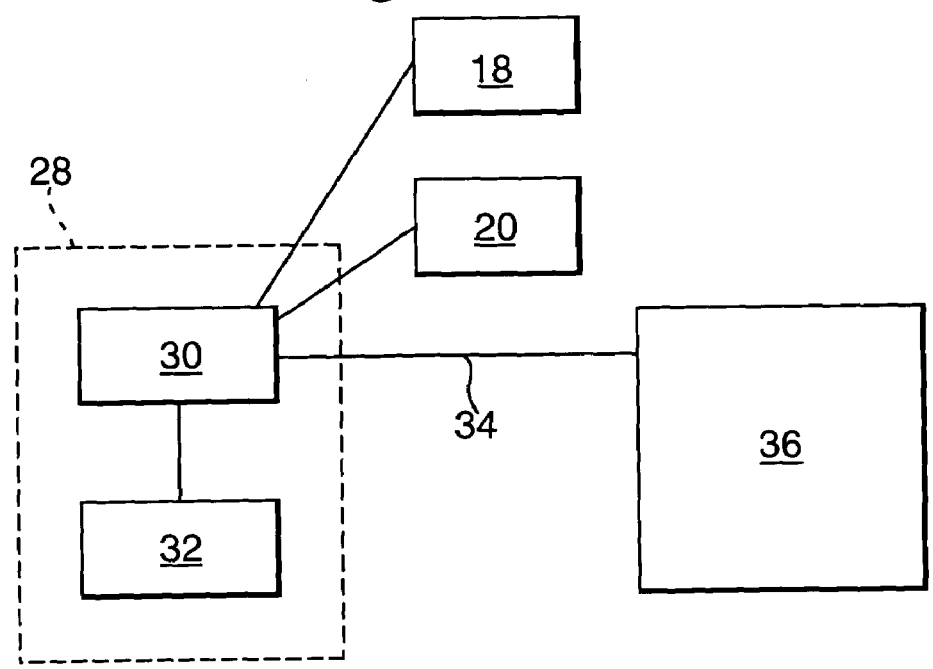
FIG. 2 illustrates, in similar simplified schematic form, the functional units used to implement the invention.

In operation of the computer 10, the processor 12 and the associated memory 14,16 form the core 28 of the computer. In order to implement the invention, appropriate software is loaded into the computer 10 in order to configure the core 28 as shown in FIG. 2. In FIG. 2, the blocks shown within the core 28 represent functional blocks of the core 2E, which may be implemented by software or hardware or a mixture of both, and may require access to memory or processing facilities, or both.

In FIG. 2, the core 28 is shown as having an interrogation engine 30, connected to the screen 18 and keyboard 20. FIG. 2 also illustrates the engine 30 connected to a table store 32 within the core 29, but which is optional, as will be described.

A further connection at 34 connects the engine 30 to a database 36. The database 36 may be stored within the computer 10. This arrangement may be appropriate when the database consists of data items carefully selected for inclusion within a proprietary database maintained by an operator, such as a commercial database company. Alternatively, the database 36 may be remote from the computer 10 with the connection 34 being provided in an appropriate manner, which may include connection via the internet or other public or private network. Furthermore, as noted above, the database 36 may symbolise the content of the entire internet or other network.

Classification Structure

Further description of the arrangements of the invention will be facilitated by reference to an example of a fictional database to which the techniques of the invention may be applied.

Figure 3:
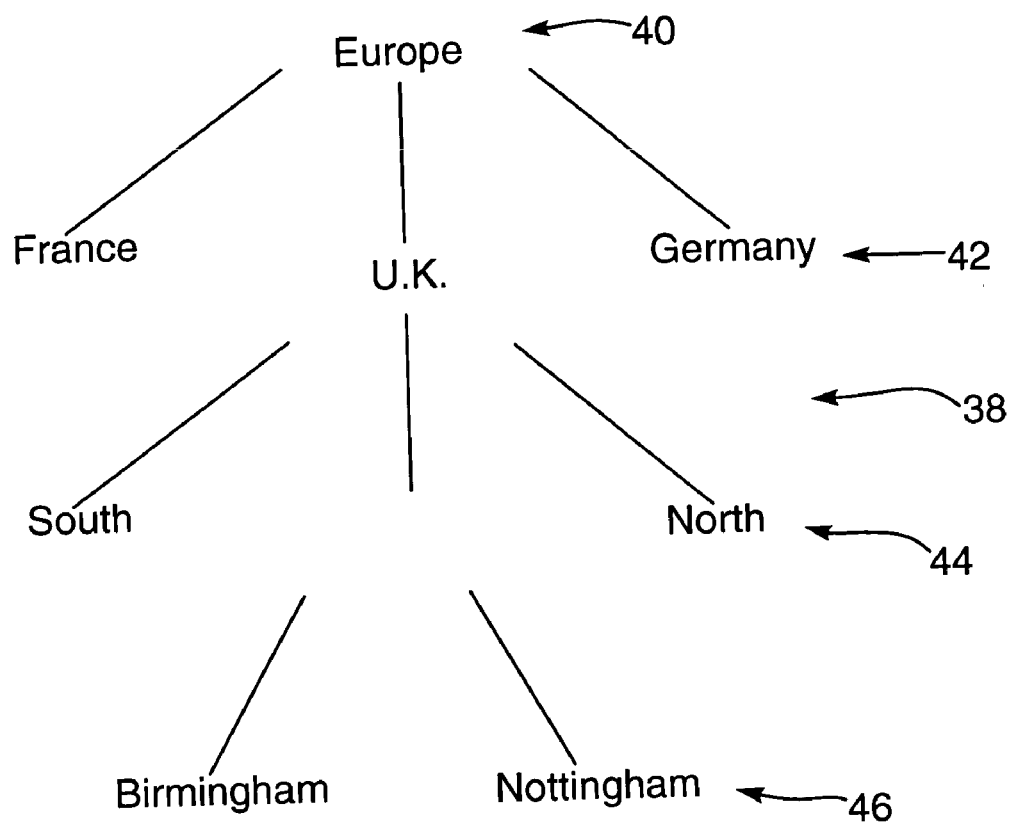
FIG. 3 illustrates a simple classification structure for a database to be interrogated in accordance with the invention.
Figure 3:
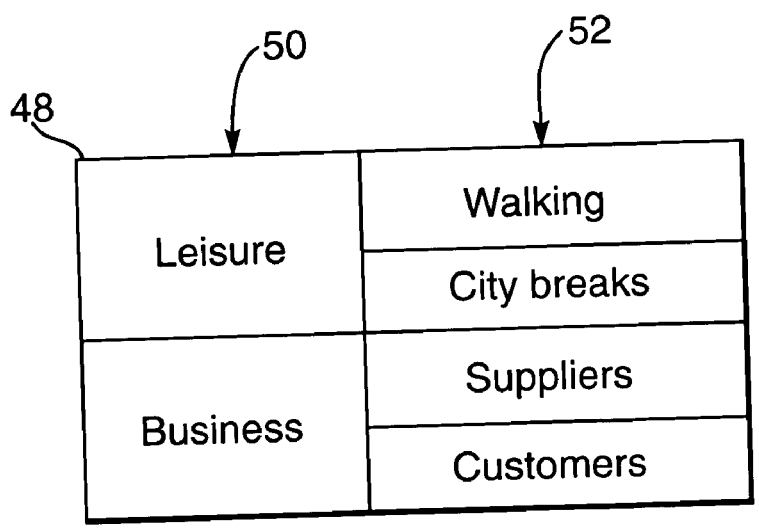

FIG. 3 illustrates a classification structure which may be used for such a database, in accordance with the invention. In this example, the database contains individual data items relating to travel within various European countries. FIG. 3 illustrates at 38 some of the limbs of the hierarchical tree of the classification structure for the database. At the highest level 40, all data items are required to relate to travel within Europe. Other potential data items are excluded from the database. At the next lower level 42 three classification headings are shown as France, U.K. and Germany. This represents the countries within Europe for which database date items are held, if any are available. The tree 38 has been simplified in this respect to refer only to three countries. In practice, it is likely that further European countries would be present at the level 42.

At the next lower level 44, each country at 42 is provided with a classification heading identifying regions of that country. In this example, three regions of the U.K. are represented at 44 Regional headings for other countries are not shown, in the interests of simplicity and clarity.

A fourth level 46, which is the lowest level in the tree 38 of this example, represents cities. In this example, only two cities are provided as classification headings within the MIDLANDS classification. Other cities will be provided at the level 46, within the classifications SOUTH and NORTH, but are not shown in the interests of simplicity and clarity.

In addition to the hierarchical tree 38, an additional classification table is provided at 48. This has two hierarchical levels, namely a division at 50 between leisure and business, and a sub-division of these classes at 52. Thus, the leisure class 50 is sub-divided at 52 into "walking" and "city breaks", representing two types of leisure or holiday style. In practice, other choices and numbers of sub-classes could be used. Similarly, the business class 50 is sub-divided into data items relating to potential suppliers and potential customers.

Each data item within the database is allocated to one or more heading at each level of the hierarchical tree 38, as appropriate to the content of that data item. In addition, each data item is allocated to one or more of the classes 50 and sub-classes 52, again as appropriate to the content of the data item. In the event that the database 36 is a proprietary database maintained by a database operator, these allocations will be made when the data item is first introduced into the database 36 and may be made manually or by automated techniques. In the event that the database 36 is not controlled, as in the case of the internet, for example, classifications will be made more dynamically, as will be described.

Results Table

It is next appropriate to describe the results table created in accordance with the invention. Examples are illustrated in FIGS. 4A, 4M and 4C. Each of these tables may represent a simplified form of a display on the screen 18 which may be used interactively by a user. Alternatively, the tables could be presented in an alternative manner, such as in printed form.

FIG. 4A illustrates a results table presented to a user consulting the database 36 at the highest level 40 of the tree 38. The level is identified at 54 by reference to the classification heading. Results are presented in a two dimensional table 56. Columns of the table are identified by the classification headings at the country level 42. That is, the columns represent the headings at the next lower level on the tree 38 from the selected level indicated at 54. The rows of the table 56 are identified by the two main classes at 50 in the class table 48. Each point in the able 56, that is, each intersection of a column and row, includes a number which represents the number of data items within the database 36, and which fall within the classification heading corresponding to that column, and have content relevant to the additional identification given by the class identifying the row. Thus, the table 56 indicates that the database 36 includes twenty items relating to the U.K. and having content concerning leisure. Seventy items within the database 36 relate to the U.K. and have content relating to business. Inclusion of a data item in the count at one of these table points is not exclusive. Thus, a data item which concerned leisure opportunities and business opportunities within the UK would be included in both scores.

In accordance with the invention, the interrogation arrangement allows the user to select one of the classification headings used as column headings, in order to move to the next lower level of the tree 38. This may be achieved by appropriate coding of software in the HTML language, allowing a mouse, or other cursor control device, to be used to select a column heading.

FIG. 4B illustrates the effect of selecting the UK. from the three options presented in the table 56 The selection is confirmed to the user at 58, indicating that the classification heading "U.K." has been selected within the heading "Europe". A fresh results table 60 is now presented to the user, based on the U.K. selection. Again, this is two dimensional and has columns representing the next lower level of the tree 38. At this point, the next is level is the region level 44 and thus, three columns are presented, representing SOUTH, MIDLANDS and NORTH. Two rows are provided, again identified by the classes 50 as HOLIDAY and BUSINESS. The table 60 again provides a score at each point of the table. Thus, the table 60 indicates that the database 36 contains three data items relating to the MIDLANDS and having content relevant to leisure. Twenty data items in the MIDLANDS classification have content relating to business. Again, data items are not allocated exclusively to one column or row.

The table 60 again allows the user to select a lower level, by selecting one of the column headings. For example, selecting MIDLANDS will replace the table 60 by a further results table illustrated in FIG. 4C.

The table 62 of FIG. 4C indicates the level at 64, i.e. that the table relates to data items within the MIDLANDS classification at the region level 44 of the tree 38.

The table 62 has two columns representing the cities at the lowest level 46 of the tree 38, Thus, one column is headed "Birmingham". Another is headed "Nottingham". The table 62 has more than one row but it is to be noted in FIG. 4C that four rows are provided and classified by the sub-classes at 52, rather than by the classes at 50. This is an important feature of the arrangement being described. The manner in which the data items are classified in the table rows is not the same at all levels of the tree 38. In general, it is expected that at high levels in the tree 38, relatively coarse division into classes may be adequate for the user, whereas at lower levels of the tree 38, finer classification may be appropriate. It is also envisaged that the classes and sub-classes presented as row identifiers may depend on choices made by the user. Thus, the sub-classes presented at the lowest level (equivalent to FIG. 4C) for cities in a region primarily renowned for winter sports may be different to those for cities in a region primarily known for sun holidays. Similarly, if the region is primarily known for agriculture or for manufacturing, for example, different business sub-classifications may be appropriate.

Selection of Entries

At any selected level of the tree 38, a user is able to select one or more points on the corresponding table, in order to request a list of the entries represented by the score at that or those points on the table. Again, this is preferably by means of a display and a cursor control device. The selected list may be provided by display, print-out or in another manner. The arrangement then allows for the user to identify one or more items on the list for retrieval in conventional manner.

Word Search

A further facility provided by the arrangement is to allow a user to implement a search strategy on the items identified by the numbers in a results table. For example, the user may conduct a word search through the items, in order to eliminate data items which do not include one or more selected words. The results table can then be presented again to the user, but with the scores revised to reflect only those data items which meet the criteria specified in the word search.

Production of Results Tables

Figure 5:
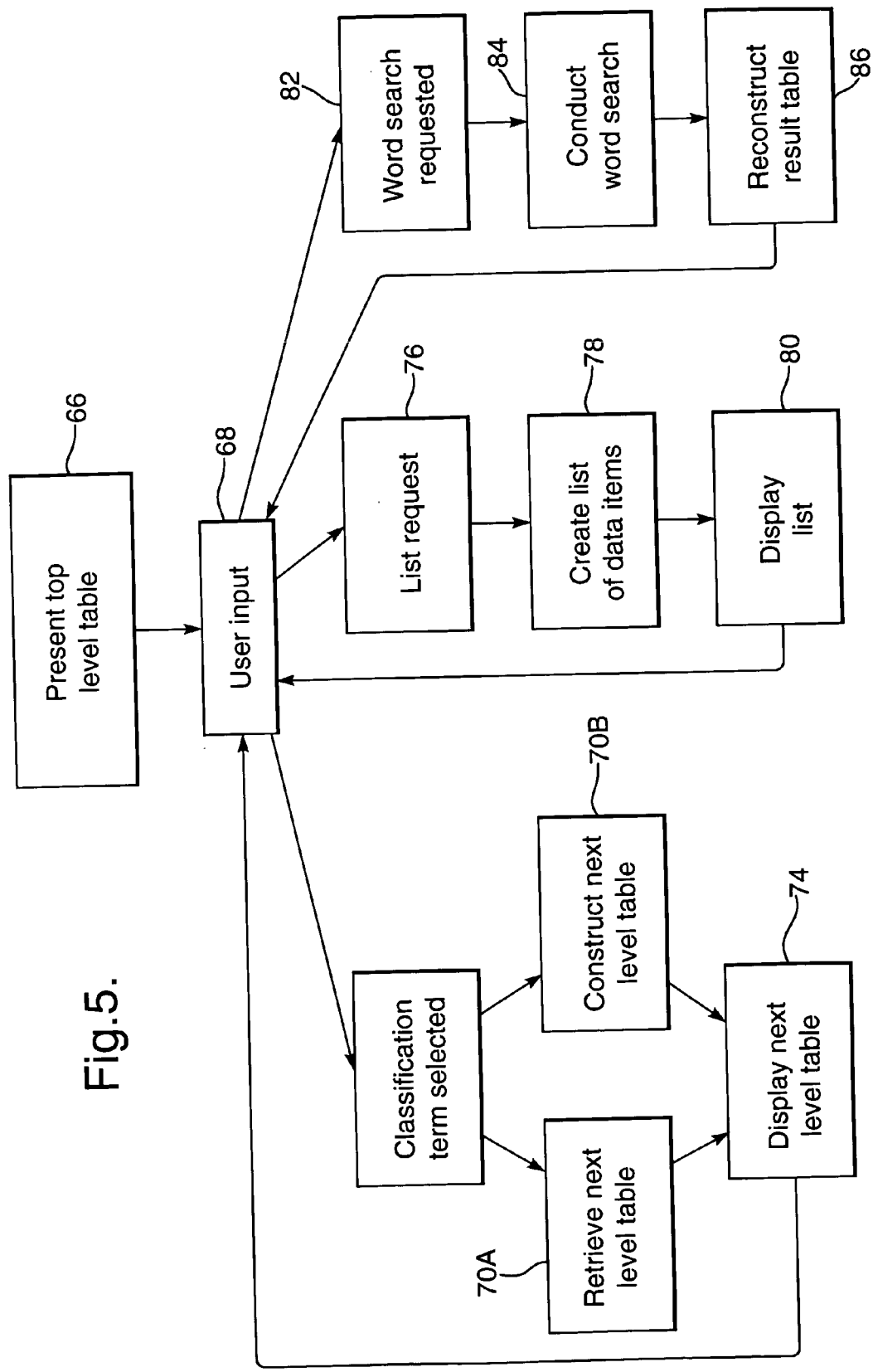
FIG. 5 is a highly simplified flow diagram of operations conducted in accordance with the invention.

Having described the classification of data items in relation to FIG. 3, and the manner in which results tables are presented to a user, with reference to FIGS. 4A, 4B and 4C, the skilled reader will now readily be able to understand the flow diagram of FIG. 5, which illustrates the manner in which the arrangement functions in order to create results tables from the contents of the database.

Operation commences at 66 by the interrogation engine 30 presenting the top level results table to the user, such as the table 56 of FIG. 4A. This is preferably presented by means of the screen 18. The engine 30 then waits for the user to take one of three actions. Initially, at the top level, this action is likely to be the selection of a lower level, as previously described. When a selection of this nature is identified at 68, the engine 30 identifies the classification term selected, at 69, and then executes step 70A or 70B, according to the manner in which the engine 30 is configured to operate. In the case of a closed and controlled database, such as a proprietary commercial database, all data items will have predetermined entries in each of the possible results tables and consequently, these tables may be stored, in a table store 32 (FIG. 2) in which case, the engine 30 retrieves the next requested table at 70A from the store 32. In the example of a controlled database, it is expected that retrieval of pre-prepared results tables will result in swifter response times.

Alternatively, for example when the database 36 is not controlled, it may be appropriate for the results table to be constructed afresh, on each occasion. Thus, the step 70D represents the construction of the next requested results table. This may be achieved by the engine 30 initiating a series of enquiries to the database 36, each enquiry being constructed as appropriate to a point on the results table being constructed. The number of data items returned from the search is then used as the entry for the results table. The identity of those items may be recorded by the engine 30, preferably temporarily, in case the user chooses to access one or more of them.

After retrieving or constructing a results table at 70A, 70B, the table is presented, preferably by display, at 74. The flow then reverts to 68 to await the next instruction from the user. The branch which has just been described may be executed repeatedly, to move up or down the classification tree, as described above.

An alternative branch of the flow diagram in used if the user requests a list of the data items represented at one or more points of a results table. When this request is identified, at 76, a list of those data items which form the score at that or those points of the results table is created at 78 (or retrieved from the table store 32) and presented to the user, preferably by display at 80.

Alternatively, the user may request an additional search, such as a word search, as discussed above. When a word search request is identified at 82, a word search is implemented at 84 The results of the additional search are used to reconstruct the results table at 86, with revised scores. The reconstructed results table is then presented to the user, preferably by display.

Advantages

The arrangements which have been described provide many advantages of various different types. For example, an important advantage is provided to the user in relation to the ease or use of the database. In this connection, it is to be noted that in contrast to conventional database interrogation techniques, the user is not required to formulate a complete search strategy at the beginning of the process. Each refinement of the search strategy (by selecting a term from a lower level of the hierarchical tree or by selecting one of the additional classification terms), is made only after the user has been presented with information which can inform the user's choice. For example, even at the highest level as illustrated in FIG. 4A, a user who had originally envisaged making an enquiry about business opportunities in France is not initially restricted to seeing only the search results relating to France, but is presented with information that the database contains data items relating to business in the UK. Indeed, the user is made aware that the database contains many more data items relating to business in the U.K. (a total of seventy), than France (a total of twenty five)The user is then able to decide whether to continue the enquiry in relation to France alone, or whether to pursue the apparently greater opportunities represented by the U.K. In the event that the user chooses to pursue the opportunities in France, the alert to the larger number of opportunities in the U.K. may prove useful in the event that none of the items located in relation to France proves satisfactory. The user is then already aware that there exists many items relating to the U.K. and thus, having failed to find what was originally envisaged, has been provided with a useful indication of possible alternative strategies.

Similarly, a user who originally envisaged booking a holiday in the U.K. Is initially presented with an indication that many more leisure opportunities exist within France or Spain. Thus, a user who had originally envisaged a holiday in the U.K. but was not particularly committed to that choice, may choose alternatively to pursue the greater number of opportunities in France or Spain. At any level, a user who is particularly interested in a holiday of a particular type can use the word search facility to revise the results table. Thus, a word search on "skiing" would result in a results table which only showed scores for skiing holidays and business opportunities relating to skiing.

Thus, the user is provided with useful information (the number of data items) concerning any choice they make, prior to that choice is made to restrict the search, and in association with equivalent information about other possible choices. This helps guide the choice of the user, without dictating that choice in any way, and greatly assists the user in making alternative choices in the event that an initial search leads to unsatisfactory items being retrieved. It is envisaged that this will lead to less frustration on the part of the user and to a more efficient retrieval of information useful to the user.

Consequently, by constructing the database interrogation arrangement to operate in this manner it is envisaged that the database can be used more efficiently by users. In particular, if the database arrangement is retrieving information from a public or private network such as the internet, network traffic relating to data items which subsequently prove to be inappropriate can be reduced, thus reducing the bandwidth requirements of the connection 34.

Naturally, it is to be expected that the reduced levels of frustration and disappointment incurred by users, particularly inexperienced users of the database, will result in additional enquiries being made to the database, particularly a proprietary database, resulting in additional business to the owner of that proprietary database.

In other research situations, the results tables may assist a user in forming connections between data items which are not intuitive, thus helping innovative thought. For example, in the examples shown in FIG. 4, a word search relating to "skiing" might return a score revealing a business opportunity in a location not well known for skiing, such as a manufacturing base. Similar non-intuitive connections could be formed in the case of a database being used for research for innovation, allowing solutions described in one field to be identified for use in similar situations in other fields.

Variations and Modifications

Many variations and modifications can be made to the apparatus and arrangements described above, without departing from the present invention.

The examples given above describe results tables which only display the number of data items at each point of the table. Additional information could be provided, particularly at lower levels of the classification structure, but this may cause the results table to appear more complex or confusing for a user.

It will be readily apparent that the arrangements which have been described can be implemented in very many different ways, according to the choice of hardware and software. Many different software languages could be used to write a database interrogation arrangement in accordance with the invention. The skilled reader will understand any requirements relating to hardware, operating systems and the like, arising from a software choice.

The classification structure can be predetermined and fixed, or may be capable of modification, either by manual intervention or by automated techniques.

Presentation of results tables to a user is preferably by means of a display selections to be made by the user are preferably made by operation of a cursor control device, such as a mouse, in order to move a cursor on the display, to make a selection.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A non-volatile recording medium including a database interrogation arrangement for use in relation to a database of data items classified according to a classification structure, in which a user is able to select a classification level within the structure, and is presented, in response to the selection, with a results table having at least two dimensions, one of the dimensions providing classification headings at the selected level of the structure, and another dimension representing classified additional identification of the content of data items within the headings provided, each point of the table showing at least the number of data items within the corresponding heading and having content relevant to the corresponding additional identification wherein a user to whom the classification headings of a level of the classification structure have been presented is able to select the next lower level by selecting one of the headings presented wherein the user is provided with a results table at each level per selection wherein said results table presents all classification headings which are at the selected level and which are sub-headings, within the classification structure, of a common heading at the next higher level wherein the said additional identification provided in a results table is different according to the chosen level.

2. A non-volatile recording medium according to claim 1, wherein the user is able to select the next higher level.

3. A non-volatile recording medium as claimed in claim 1, wherein the additional identification represents the next lower level of the classification structure, or sub-classifications which do not form a layer within the classification structure.

4. A non-volatile recording medium as claimed in claim 1, wherein any point on the results table is selectable, alone or with others, and the arrangement is operable to produce a list of those data items identified at that point of the table.

5. A non-volatile recording medium as claimed in claim 1, which further provides for a search through those data items identified at one or more specified points on the results table, to revise the number shown at that point, in accordance with the results of the search.

6. A non-volatile recording medium according to claim 5, wherein a word search is available.

7. A non-volatile recording medium as claimed in claim 1, wherein the arrangement is operable for entering data items into the database, by identifying appropriate classifications for the data item within the classification structure, and appropriate additional identifications of the contents of the data item.

8. A non-volatile recording medium as claimed in claim 7, wherein the classifications and additional identifications are identified manually or automatically.

9. Computer apparatus operable to provide a database interrogation arrangement as claimed in claim 1.

10. Computer software which, when installed on a computer system, is operable to provide a database interrogation arrangement as defined in claim 1.

11. A non-volatile recording medium as claimed in claim 1, the medium being a transmission medium, the software being carried by a signal propagating on the transmission medium.

* * * * *